(12) United States Patent
Yadhav et al.

(10) Patent No.: US 11,729,060 B2
(45) Date of Patent: Aug. 15, 2023

(54) METHODS AND NODES FOR CLUSTER FORMATION

(71) Applicant: Telefonaktiebolaget LM Ericsson (publ), Stockholm (SE)

(72) Inventors: Vinay Yadhav, Upplands Väsby (SE); Daniel Turull, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 240 days.

(21) Appl. No.: 16/970,680

(22) PCT Filed: Feb. 22, 2018

(86) PCT No.: PCT/SE2018/050173
§ 371 (c)(1),
(2) Date: Aug. 18, 2020

(87) PCT Pub. No.: WO2019/164427
PCT Pub. Date: Aug. 29, 2019

(65) Prior Publication Data
US 2020/0382375 A1    Dec. 3, 2020

(51) Int. Cl.
*H04L 12/24*    (2006.01)
*H04L 41/0893*    (2022.01)
*H04L 41/08*    (2022.01)

(52) U.S. Cl.
CPC ...... *H04L 41/0893* (2013.01); *H04L 41/0886* (2013.01)

(58) Field of Classification Search
CPC .................. H04L 41/0893; H04L 41/0886
See application file for complete search history.

(56) References Cited

U.S. PATENT DOCUMENTS

| 7,734,960 B2 * | 6/2010 | Mandal | H04L 45/46 714/48 |
| 2016/0105323 A1 * | 4/2016 | Haeupler | G06F 9/5061 709/224 |
| 2017/0364423 A1 * | 12/2017 | Peng | G06F 11/203 |

FOREIGN PATENT DOCUMENTS

| EP | 2833265 A1 | 2/2015 |
| WO | 2013160438 A2 | 10/2013 |

OTHER PUBLICATIONS

International Search Report and the Written Opinion of the International Searching Authority, issued in corresponding International Application No. PCT/SE2018/050173, dated Oct. 17, 2018, 11 pages.

* cited by examiner

Primary Examiner — Kim T Nguyen
(74) Attorney, Agent, or Firm — Rothwell, Figg, Ernst & Manbeck, P.C.

(57) ABSTRACT

A method for forming a cluster of nodes. The method includes obtaining first information associated with a predetermined number of nodes in the cluster. The method also includes determining an administrative role of the first node based on the obtained first information. The method also includes, as a result of determining that the administrative role of the first node is a first role, broadcasting a first broadcast message, thereby enabling a plurality of nodes that are not in the cluster to receive the first broadcast message, wherein the plurality of nodes that are not in the cluster includes at least a second node, the first broadcast message comprising second information for controlling the timing at which each node within the plurality of nodes transmits to the first node a response message responsive to the broadcast message. The method also includes receiving a first response message responsive to the first broadcast (Continued)

message, wherein the first response message was transmitted by the second node. The method also includes, after receiving the first response message, adding the second node to the cluster.

18 Claims, 13 Drawing Sheets

METHODS AND NODES FOR CLUSTER FORMATION

CROSS REFERENCE TO RELATED APPLICATION(S)

This application is a 35 U.S.C. § 371 National Phase of PCT/SE2018/050173, filed Feb. 22, 2018, designating the United States.

TECHNICAL FIELD

The proposed technology relates to methods and nodes for forming a cluster of nodes. Furthermore, computer programs, computer program products, and carriers are also provided herein.

BACKGROUND

Managing nodes in data networks is increasingly challenging with the number of nodes involved. This becomes apparent when, for example, distributing software updates to nodes such as servers, desktops, wireless devices, etc., in a corporate network, where manual methods soon have to be replaced by more practical automated methods as the network size grows. The need for automated solutions may be even more explicit in today's datacenters, which are built with ever larger number of nodes. The trend is expected to continue in the future as the demand for application and services running in the cloud keeps increasing. A challenge is thus how to manage the large number of nodes in an automated way that requires minimal human intervention.

One solution for managing many nodes is to organize them into clusters of manageable size. Such a cluster of nodes may herein also be called a group of nodes. Once the nodes have been organized into clusters of manageable size, a lot of tasks, such as application and service scheduling, messaging, etc., become more efficient. However, also the initial process of forming clusters needs to be done in an automated way with minimal manual handling or configuration and should further be scalable when the number of nodes increases.

The methods of cluster formation today may generally be divided into those that are centralized and those that are distributed. In centralized solutions, a centralized system is necessary for organizing and orchestrating the process. As a nature of centralized systems, they are susceptible to single point of failure and also have poor scalability. In large systems, the number of communication messages needed to organize the many nodes into clusters is significant, resulting in high load on the data links in the network, as well as the centralized system. This is not an ideal situation and in particular when a lot of nodes are started at the same time, since the communication between the nodes can lead to a message storm in the communication channel. This can have an adverse effect on the time required to organize the nodes into clusters. In solutions that are distributed, the nodes must coordinate between themselves to form clusters. This requires the nodes to be aware of other nodes and use the broadcast communication channel extensively to discover and organize themselves, which leads to a lot of messages sent and received. Some existing solutions also require pre-configuration of nodes for providing information regarding which cluster the different nodes should belong to.

SUMMARY

It is an object of the present disclosure to provide methods and nodes for improved forming of a cluster of nodes, addressing, or at least alleviating, at least some of the problems described above.

This and other objects are met by embodiments of the proposed technology.

According to a first aspect, there is provided a method performed by a first node for forming a cluster of nodes. The method comprises the step of obtaining first information associated with a predetermined number of nodes in the cluster. The method further comprises a step of determining an administrative role of the first node based on the obtained first information. As result of determining that the administrative role of the first node is a first role, the first node sends a first broadcast message to a plurality of second nodes, the first broadcast message comprising second information for enabling control of timing of a respective response message from two or more second nodes of said plurality of second nodes. The method also comprises the steps of receiving said respective response message from the two or more second nodes and adding said two or more second nodes to the cluster.

According to a second aspect, there is provided a first node for forming a cluster of nodes. The first node is configured to obtain first information associated with a predetermined number of nodes in the cluster. The first node is further configured to determine an administrative role of the first node based on the obtained first information. As a result of determining that the administrative role of the first node is a first role, the first node is configured to send a first broadcast message to a plurality of second nodes, the first broadcast message comprising second information for enabling control of timing of a respective response message from two or more second nodes of said plurality of second nodes. The first node is also configured to receive said response message from the two or more the second nodes and add said two or more nodes to the cluster.

According to a third aspect, there is provided a method performed by second node for forming a cluster of nodes. The method comprises the step of obtaining first information associated with a predetermined number of nodes in the cluster. The method further comprises a step of determining an administrative role of the second node based on the obtained first information. As a result of determining that the administrative role of the second node is a second role, the second node in a further step receives a first broadcast message from a first node, the first broadcast message comprising second information for controlling a sending time of a response message, and responsive to receiving the first broadcast message, the second node initiates a task of preparing a response message.

According to a fourth aspect, there is provided a second node for forming a cluster of nodes. The second node is configured to obtain first information associated with a predetermined number of nodes in the cluster. The second node is further configured to determine an administrative role of the second node based on the obtained first information. As result of determining that the administrative role of the second node is a second role, the second node is configured to receive a first broadcast message from a first node, the first broadcast message comprising second information for controlling a sending time of a response message. The second node is further configured to, responsive to receiving the first broadcast message, initiate a task of preparing a response message.

According to a fifth aspect, there is provided a computer program comprising instructions which, when executed by at least one processor causes the at least one processor to perform the method of the first aspect.

According to a sixth aspect, there is provided a computer program comprising instructions which, when executed by at least one processor causes the at least one processor to perform the method of the third aspect.

According to a seventh aspect, there is provided a computer program product comprising a computer-readable medium having stored there on a computer program of according to the fifth aspect or the sixth aspect.

According to an eighth aspect, there is provided a carrier containing the computer program according to the fifth aspect or the sixth aspect, wherein the carrier is one of an electric signal, optical signal, an electromagnetic signal, a magnetic signal, an electric signal, radio signal, a microwave signal, or computer readable storage medium.

An advantage of the proposed technology disclosed herein is that there is no or reduced need for manual intervention or extensive configuration. In some embodiments the required number of messages on the communication channel for cluster formation is reduced. Some methods and nodes disclosed herein are very well suited for situations where a lot of nodes startup within a short interval of time and begin the process of cluster formation.

BRIEF DESCRIPTION OF THE DRAWINGS

Examples of embodiments herein are described in more detail with reference to attached drawings in which.

DETAILED DESCRIPTION

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout. Any step or feature illustrated by dashed lines should be regarded as optional.

Figure 1:
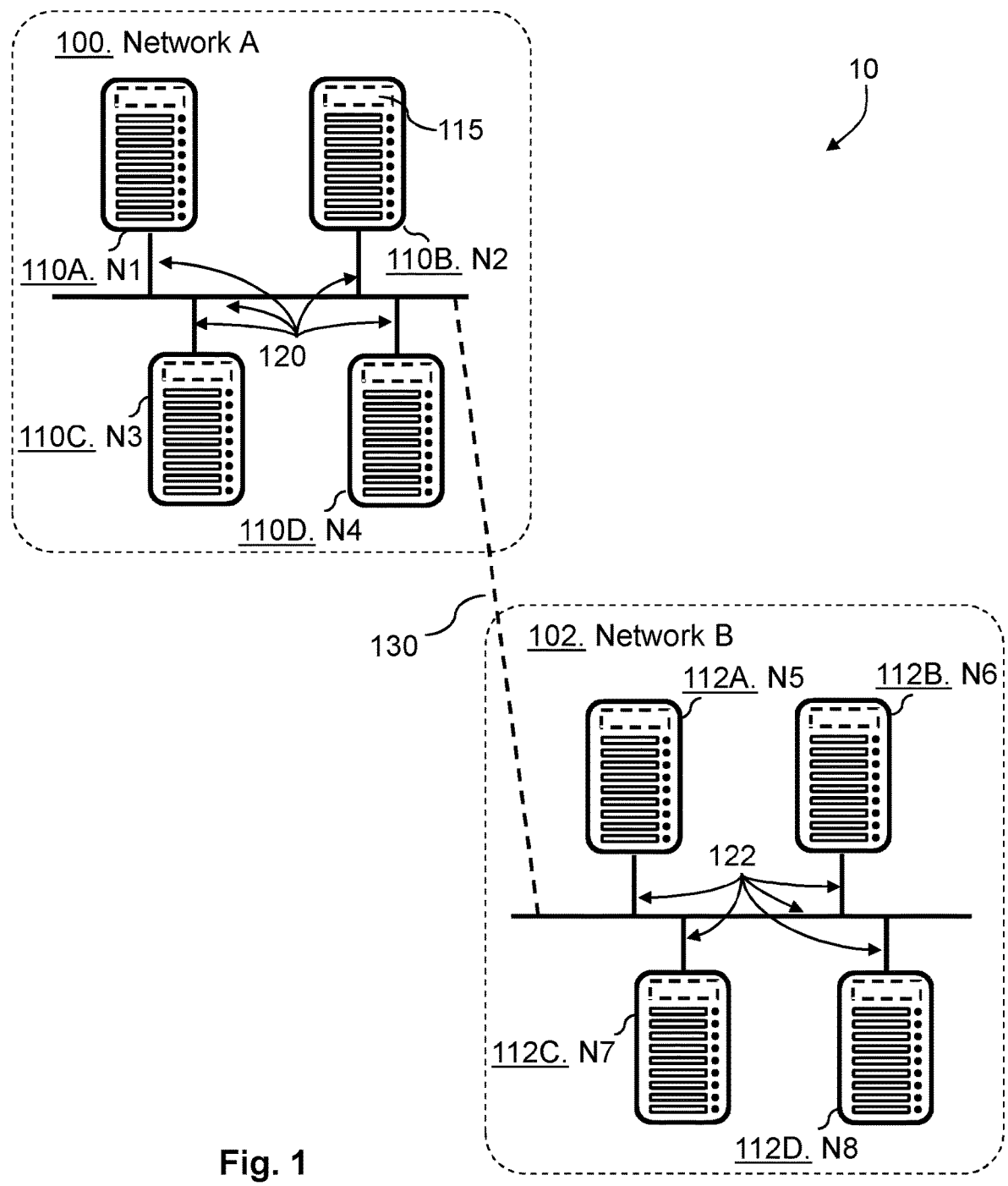
FIG. 1 is a schematic block diagram illustrating an embodiment of a system for forming a cluster of nodes in accordance with various aspects described herein.

FIG. 1 illustrates schematically an exemplary system 10 in which embodiments of the present disclosure may be implemented. The system 10 comprises two networks Network A 100 and Network B 102, each comprising a number of nodes 110A-D, 112A-D connected by communication links 120, 122, respectively. The node may e.g. be a server, a Virtual Machine (VM), or a process. In this example Network A 100 comprises four nodes N1-N4 110A, 110B, 110C,110D, connected with each other through communication links 120. Similarly, Network B 102 comprises four nodes N5-N8 112A, 112B, 112C, 112D which are connected with each other via communication links 122. Network A 100 and Network B 102 may further be connected to each other by communication link 130. Network A 100 and Network B 102 may for example be located at different geographical locations. The nodes N1-N8 110A-D, 112A-D in the system 10 may thus in some examples be able to communicate via links 120, 122 and 130. One or more of the nodes N1-N8 110A-D, 112A-D may also comprise a cluster manager 115 as will be explained in further detail below. It will be appreciated that embodiments herein are useful for efficiently forming one or more clusters of nodes, for example among nodes N1-N8 110A-D,112A-D in the exemplary system 10, without the need of, or at least limited, manual intervention.

Methods and nodes according to embodiments herein may advantageously be used in networks comprising a large number of nodes, e.g., data centers, corporate networks, and the like, particularly during simultaneous startup, or startup within a limited time interval, of the nodes. However, other fields of use are in systems and arrangements comprising several processes starting up simultaneously and need to form a cluster.

Figure 2:
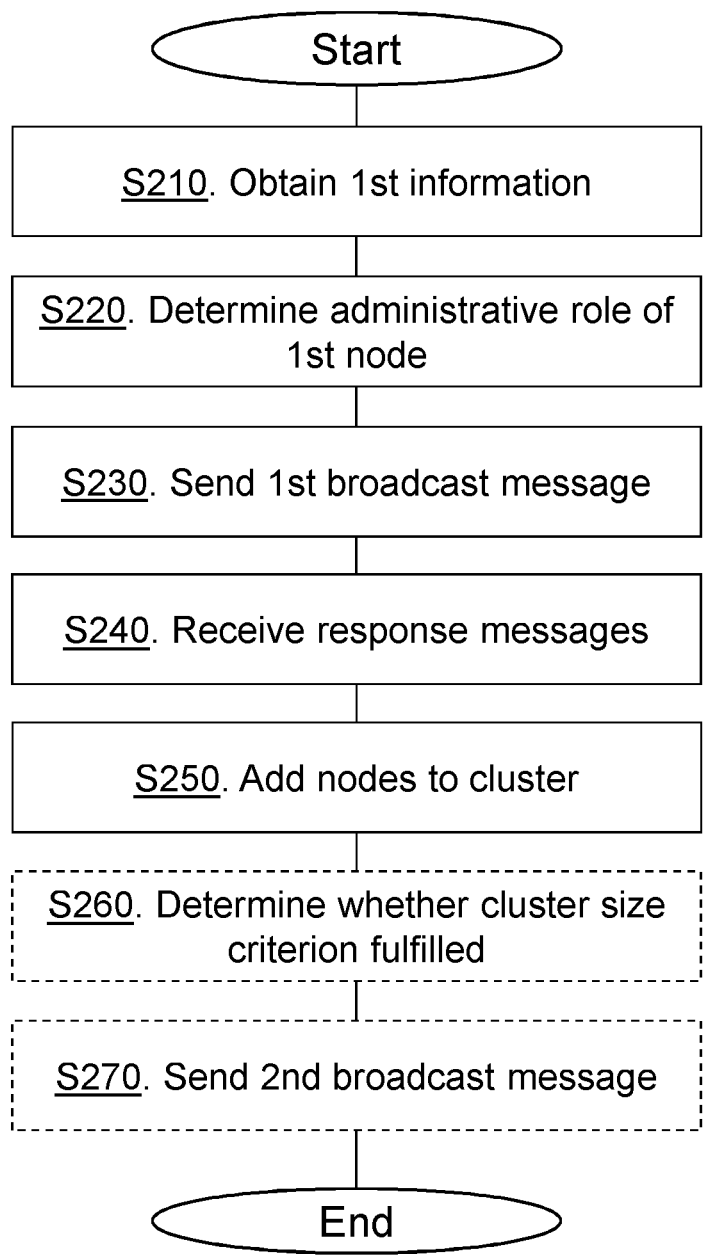
FIG. 2 is a flow diagram depicting an embodiment of a method in a first node for forming a cluster of nodes in accordance with various aspects described herein.

FIG. 2 is a flow diagram depicting an embodiment of a method in a first node for forming a cluster of nodes. The method will now be described in detail with further reference also to the system of FIG. 1.

In step S210, the first node obtains first information associated with a predetermined number of nodes in the cluster. The first node may for example obtain information indicating that the number of nodes to include in the cluster to be formed is limited to a certain number. The number of nodes in the cluster may also be called the cluster size. For example, the nodes to be included in the cluster may not exceed a number specified in the obtained information. Such information may also be presented in other forms, e.g., terms such as micro, macro, etc., the term hence representing a predefined cluster size. As one example, nodes N1-N4 110A, 110B, 110C, 110D in Network A 100 may be subject to cluster formation. For this purpose, a first node obtains first information indicating that the cluster size is, e.g., 4. This may thus suggest that all nodes in Network A will be included in the cluster. In another example, only a subset of the nodes, e.g. N1 110A and N2 110B in Network A 100, and in addition, e.g., all the nodes N5-N8 112A-D in Network B 102 are subject to cluster formation. The first information may in this example indicate that the cluster size is, e.g., 3, therefore suggesting that two clusters will be formed from the six nodes involved. Based on the obtained first information, the first node is able to determine in step S220 an administrative role of the first node. In the method of forming a cluster of nodes according to embodiments herein, one or more of the nodes involved have different administrative roles than other nodes. As will be explained further, a node with a certain role may e.g. perform a specific set of tasks or steps associated with the role, at least during the cluster forming process. As a result of determining that the administrative role of the first node is a first role, the first node sends in step S230 a first broadcast message to a plurality of second nodes. As an example, a node N2 110B, when being a first node, in Network A and having determined that its role is the first role, the first node sends the first broadcast message to other nodes N1 110A, N3 110C and N4 110D in the network. This first broadcast message comprises second information for enabling control of timing of a respective response message from two or more second nodes of the plurality of second nodes. By this step, the first node may, directly or indirectly, affect the time of reception at the first node of response messages, which the first node receives in response to the sent first broadcast message. In step S240, the first node receives the respective response message from the two or more second nodes. In the above example, node N2 110B may hence receive a response message from two or more of the other nodes N1 110A, N3 110C and N4 110D in Network A 100, and the time of reception may thus be different for two or more of the receives messages. The first node in step S250 adds the two or more second nodes to the cluster. At this point a cluster of nodes has been formed, the cluster comprising the first node and the two or more second nodes, from which a response message has been received.

The method defined by steps S210-S250 above provides that the response messages are received by the first node at different times, i.e., they are distributed in time. This has the advantage that the load on communication channels between nodes involved in the clustering, e.g., represented by communication links 120 in Network A 100 and communication links 122 in Network B 102 and communication link 130 between the networks, is evened out in time and congestion or overload is avoided. A further, related, advantage is that the first node receives at least some of the response messages at different times, which reduced the risk of overload of the first node when processing the received messages. An additional or alternative advantage is that the cluster formation may be completed in shorter time, as message storms, and thus e.g. congestion situations, are avoided.

In further embodiments, the method may further comprise determining in step S260 whether a number of nodes in the cluster fulfills a cluster size criterion based on the first information. The first node having the first role, e.g., concludes that the number of nodes added to the cluster has now reached a predetermined limit. In this embodiment the first node, as a result of determining that the cluster size criterion is fulfilled, further sends in step S270 a second broadcast message to the plurality of nodes, the second broadcast message comprising an indicator for indicating that a time of responding to said first broadcast message has expired. By sending this second broadcast message, the first node may thus inform the other nodes that the first node does not expect any further responses to the sent first broadcast message.

Some further details of the disclosed technology will now be described. In response to the first broadcast message, the first node expects receiving a response message from two or more second nodes of the plurality of nodes that are receivers of the first broadcast message. Normally one response message from each of the two or more second nodes of the plurality of nodes is received by the first node. However, in certain embodiments a second or further response messages may be received in response to the sent first broadcast message, before the first node adds a second node to the cluster. Hence, according to some embodiments of the method, the first node has received the one or more response messages from each of two or more second nodes and upon determining that the cluster size criterion is fulfilled, sends the second broadcast message. This second broadcast message may thus be received by the plurality of nodes. At this point in time, the first node may therefore not have received the one or more response messages required to add a second node to the cluster, from all nodes of the plurality of nodes that received the first broadcast message. It should be noted that the first node may have received a response message(s) from further nodes of the plurality, in addition to the two or more second nodes that are added to the cluster, however, the first node may stop adding further nodes to the cluster when the cluster size criterion is fulfilled.

An advantage of the embodiment according to S260-S270 is that the cluster formation process may be terminated when the cluster has reached the predetermined cluster size, thus reducing the load on the communication channels as well as the first and second nodes.

In some embodiments, the indicator indicates that the cluster size criterion is fulfilled. This may thus be considered explicit information to the nodes receiving the second broadcast message.

In one embodiment, obtaining first information in step S210 comprises receiving the first information from an operations and maintenance (O&M) node or pulling said first information from a configuration table. A first node may for example receive the information associated with the cluster size in a message from an O&M node via communication links 120, 122. Alternatively, such information may be pulled from e.g. a database or configuration file, located in or remote to the first node. The information may be present in a configuration table.

As described previously, the administrative role of the node affects the steps performed during the cluster formation. Thus, in some embodiment, the first role comprises a leader of the cluster. This role suggests that the first node may have a leading role, e.g., an organizer or central role, of the cluster formation.

In a further embodiment, the step S220 of determining the administrative role is based on a calculated probability, wherein the first node assumes the first role when a number, randomly generated by the first node, $R<P\times N$, wherein $P=1/M$, M equals the predetermined number of nodes in the cluster, $0 \leq R \leq N$, and N is a positive integer.

By this step, the number of nodes having the first role is made dependent on the predetermined cluster size. Further, a sufficient number of nodes assumes the first role with a certain probability.

In another embodiment, the two or more second nodes are fewer than the plurality of second nodes. According to this embodiment, the two or more nodes added to the cluster is a subset of the plurality of nodes that receives the first broadcast message.

In one embodiment, enabling the control of timing of a respective response message from two or more second nodes comprise controlling a time of reception of said respective response message at the first node.

In another embodiment, enabling the control of timing of a respective response message from two or more second nodes comprise controlling that a time of reception of two or more response messages are different.

In yet another embodiment, enabling the control of timing of a respective response message from two or more second nodes comprise controlling that a reception of said respective response message are distributed in time at the first node.

In a further embodiment, the sending in step S230 of the first broadcasting message initiates a task at the plurality of second nodes. In specific embodiments, the task may, e.g., comprise obtaining an answer to a question, and additionally or alternatively, the second information is associated with a time of finalizing the task.

In some embodiments, the response message comprises an answer to a question.

In yet further embodiments, the second information comprises a question.

In one embodiment, a time of receiving in step S240 said respective response message from the two or more second nodes is associated with a respective time of obtaining an answer to a question at the two or more second nodes.

In some embodiments, the second broadcast message is the second information. According to this embodiment, the second broadcast message is in itself the second information. Thus, the type of broadcast message, or a message name, may indicate the second information to the receiver of the message.

In some embodiments, the first node is provided with a cluster manager 115, which may be a dedicated function comprised in the node for, e.g., processing messages, information, and the like, relating to the method of forming of clusters. The cluster manager 115 may be responsible for the creation of clusters.

Figure 3:
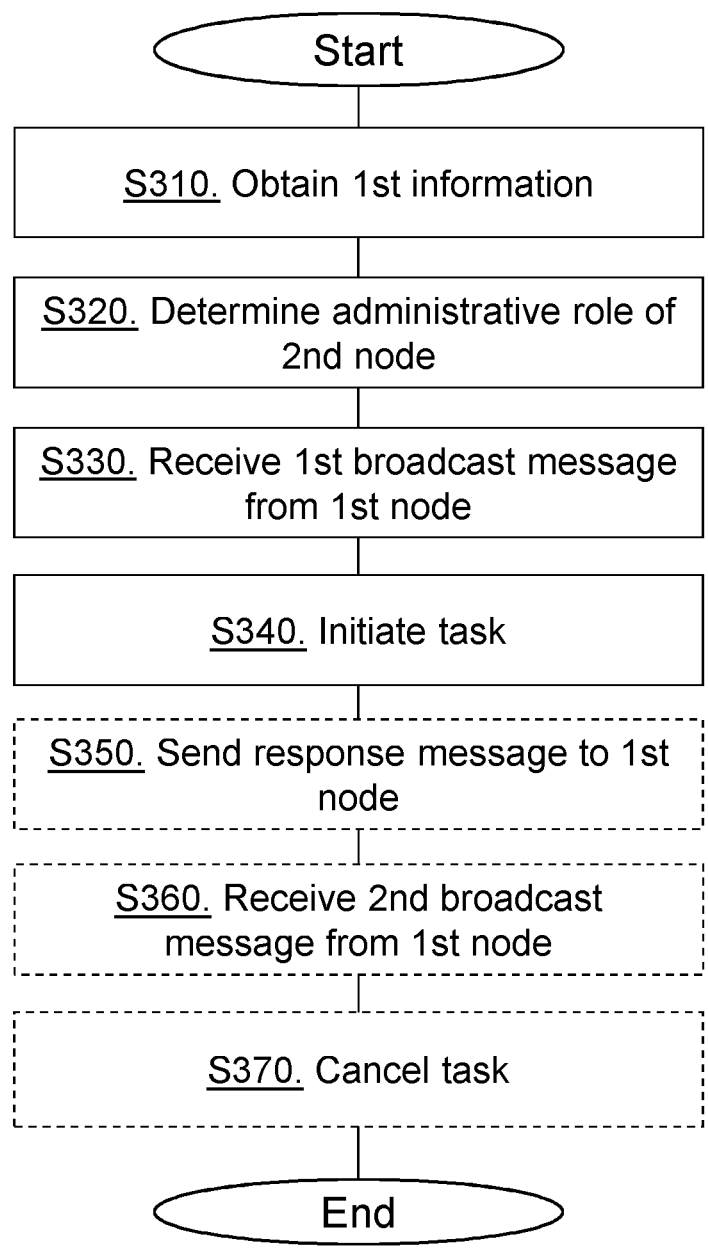
FIG. 3 is a flow diagram depicting an embodiment of a method in a second node for forming a cluster of nodes in accordance with various aspects described herein.

Turning now to FIG. 3, the flow diagram depicts an embodiment of a method in a second node for forming a cluster of nodes in accordance with various aspects described herein. The method will now be described in detail with further reference also to the system of FIG. 1.

In step S310, the second node obtains first information associated with a predetermined number of nodes in the cluster. Similarly, as described above for the first node, the second node may obtain information specifying the number of nodes to include in the cluster to be formed. The information obtained by the second node may, e.g., be a number. As an example, the nodes to be included in the cluster may not exceed a number specified in the obtained information. Such information may also be presented in other forms, e.g., terms such as micro, macro, etc., the term hence representing predefined cluster size. As one example, nodes N1-N4 110A, 110B, 110C, 110D in Network A 100 may be subject to cluster formation. For this purpose, a second node obtains first information indicating that the cluster size is, e.g., 3, thus suggesting that a subset of the nodes in Network A will be included in the cluster. In another example, additionally, e.g., all the nodes N5-N8 112A, 112B, 112C, 112D in Network B 102 are subject to cluster formation. The first information may in this example indicate that the cluster size is, e.g., 4, therefore suggesting that two clusters will be formed from the eight nodes involved. Based on the obtained first information, the second node is able to determine in step S320 an administrative role of the second node. As described previously, the nodes involved in the forming of a cluster assume different administrative roles, wherein a certain role is associated with specific steps performed by the node, at least during the cluster forming process. As a result of determining that the administrative role of the second node is a second role, the second node receives in step S330 a first broadcast message from a first node, the first broadcast message comprising second information for controlling a sending time of a response message. It may here be noted that the second node assumes a different administrative role than the first node during the cluster formation process. The second information provided by the first broadcast message, as indicated above, affects the point in time when a response message may be sent from the second node. In step S340, the second node, responsive to receiving the first broadcast message, initiates a task of preparing a response message. The second node having the second administrative role thus is a recipient of a first broadcast message, such as the first broadcast message described in connection with the first node. When receiving the first broadcast message a task is triggered at the second node. It will be described below that the task may be of different types.

In one embodiment, the step S310 of obtaining first information comprises receiving the first information from an operations and maintenance (O&M) node or pulling said first information from a configuration table. The first information may be received by, or pushed to, the second node from a different node, such as an (O&M) node, or be fetched by the second node. The information is, e.g., stored locally at the second node or in remote node, and may be comprised in a configuration table.

In a further embodiment, the second role comprises a joiner of the cluster. The second node thus has an administrative role that may suggest less activity in the second node during the cluster formation process. As an example, the second node may only receive a message from a single other node, i.e., a first node, during the cluster forming process, whereas a first node may communicate with many other, second nodes, when forming a cluster.

In another embodiment, the step S320 of determining the administrative role is based on a calculated probability, wherein the second node assumes the second role when a number, randomly generated by the second node, $R \geq P \times N$, wherein $P=1/M$, M equals the predetermined number of nodes in the cluster, $0 \leq R \leq N$, and N is a positive integer. By using the proposed calculated probability, a suitable number of node have the second role as administrative role for efficient forming of clusters.

In a further embodiment, the method further comprises, as a result of finalizing the task of preparing a response message, sending the response message to the first node in step S350.

It is thus suggested that the task performed by the second node will take a certain time to complete and the second node may then proceed with sending a response to the first broadcast message. The time to complete the task may advantageously differ for the different second nodes participating in the cluster formation process, thereby providing a load that is evenly distributed in time on the communication links and the first node.

In some embodiments, the time of finalizing the task of preparing a response message is associated with the second information.

In further embodiments, the response message comprises an answer to a question.

In yet further embodiments, the task of preparing a response message comprises obtaining an answer to a question comprised in the second information.

When receiving the first broadcast message, the second node thus starts a task that takes a certain time to complete. The task may be finding an answer to a question, which may be comprised e.g. in the first broadcast message from the first node or is comprised in the second node already when receiving the broadcast message. In the latter case the question may be provided to the second node during a configuration procedure or be preconfigured in the second node.

According to some embodiments, the answer to the question is sent to the first node, for instance for verifying the correctness of the answer before adding the second node to the cluster.

In other embodiments the second node may indicate that the task has been finalized, e.g. an answer has been obtained, by the mere fact that a response message is sent to the first node. The first node hence will not be able to verify the correctness of the answer. However, this reduces the information included in the response message and eliminates the step of verification at the first node.

In one particular embodiment, which may be alternative to finalizing the task, the method may further comprise receiving in step S360 a second broadcast message from the first node. In this embodiment the second node further, responsive to receiving in step S360 the second broadcast message, cancel in step S370 the task of preparing a response message.

In a further alternative embodiment, the second node comprises a timer which indicates a time for completing the task. The timer may be set when receiving the first broadcast message. The second node hence may or may not complete the task before the timer expires. In the former case the second node may send the response message to the first node, whereas the second node may in the latter case cancel the task before it is finalized, and no response message is therefore sent to the first node.

The embodiment comprising steps S360-S370 may hence suggest that the second node was not able to complete the task in time. As described previously, the time for finalizing the task is advantageously different at the different second nodes involved in the cluster formation process, which evens out the load. As a result, some second nodes will complete the task in time and send a response message to the first node in response to the received first broadcast message and may therefore be added to the cluster. Other second nodes may cancel the task before it is completed and will hence not be included in the cluster.

It should be noted that a system, such as system 10 of FIG. 1, when subject to the methods according to embodiments herein, may comprise several first nodes during the cluster forming process. Second nodes may therefore participate in several simultaneous cluster forming processes. One second node may thus have received several first broadcast messages, each from a different first node. This means that if not timely completing the task associated with one cluster being formed, the second node may still be able to complete a task associated with another cluster being formed, in time, and be added to the other cluster.

In some embodiments, the second node is provided with a cluster manager 115, which may be a dedicated function comprised in the node for, e.g., processing messages, information, and the like, relating to the method of forming of clusters.

Some particular embodiments of the proposed technology will now be described with reference to FIGS. 4-6. As described above, the nodes involved in the method for forming a cluster of nodes assume a first role or a second role. The first and second nodes may thus assume a leading role and a joining role, respectively. According to some embodiments herein, the methods of cluster or group formation may be based on an Ask-Answer scheme of resolving membership, particularly when the task performed by the second node is to obtain an answer to a question. The methods define two roles, namely 'Asker' and 'Answerer'. The first node may therefore be called an Asker node and the second node may be called an Answerer node. A node in the system at any given point in time can be either an Asker or Answerer. The only input or configuration that the methods require may for example be the cluster size of the cluster being formed. Accordingly, the methods may for example be based on the following simple rules:

1. The Asker nodes in the system assume the role of the cluster leader responsible for creating their clusters.

2. The Answerer nodes in the system seek to join and be a part of a cluster.

3. Asker nodes challenge other nodes (Answerers) in the system with a question that can be sent out as a broadcast message on broadcast communication channel, so that all the Answerer nodes can listen to it.

4. Answerer nodes may pick any or all questions posed by Asker nodes to find the solutions. And once they have the solution they can answer back the Asker node that posed the question.

5. Once the Asker has received enough answers from answerer nodes it finalizes its cluster and withdraws the posed question.

In short, the methods are based on a principle that, to be a member of a cluster one has to answer a question posed by the leader of that cluster.

A node in the system may determine whether it is an Asker or Answerer based on a probability P. P can be calculated by knowing the size of the cluster denoted M, $P=1/M$. A node can be an Asker with probability P and an Answerer with probability of $1-P$.

Figure 4:
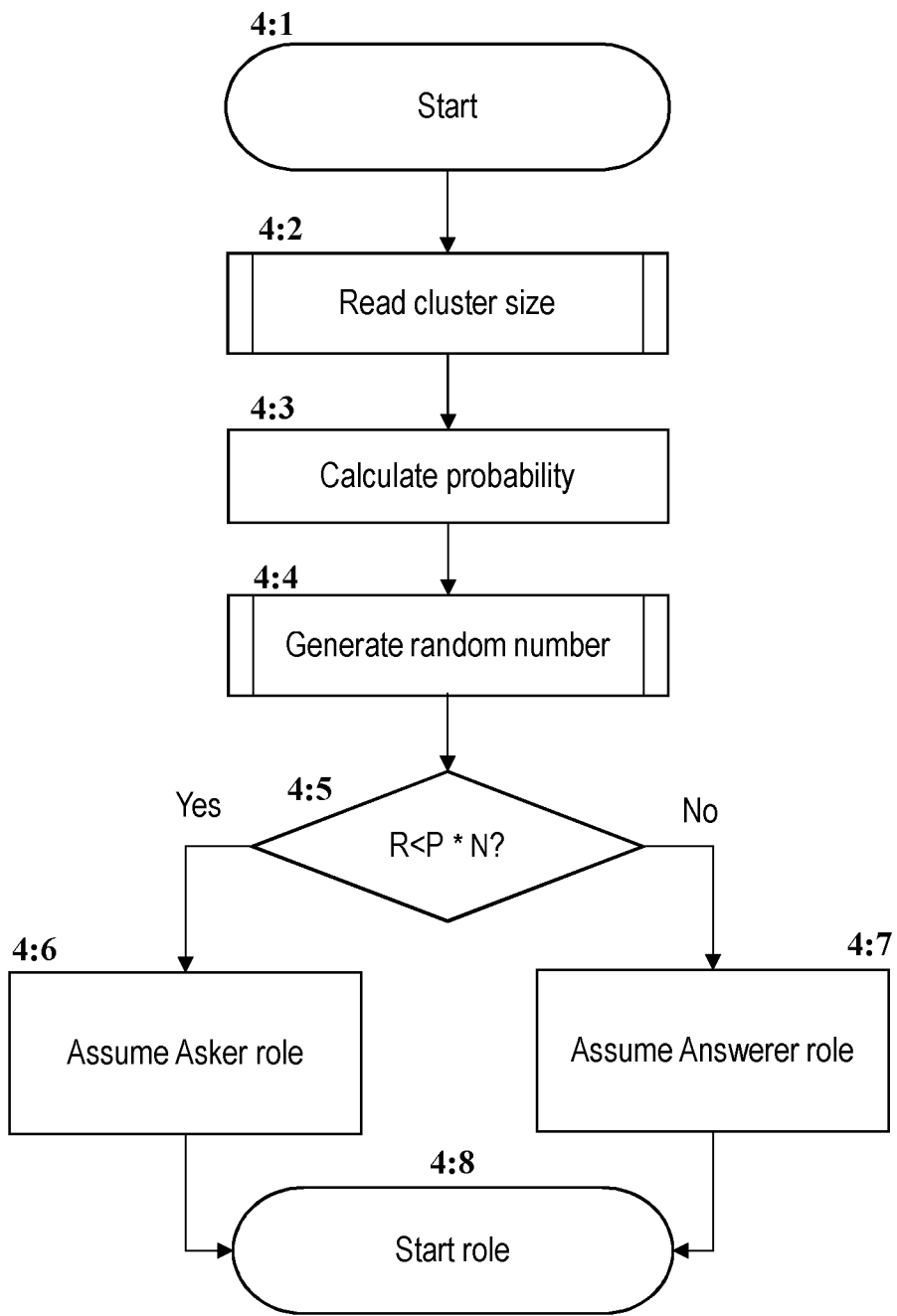
FIG. 4 is a flowchart depicting another embodiment of a method for forming a cluster of nodes in accordance with various aspects described herein.

FIG. 4 is a flowchart depicting exemplary steps for assuming an administrative role according to embodiments herein. The following steps may thus be performed by a node in the cluster formation process:

4:1 The method starts. When a node in a network subject to a cluster formation process starts up, it may self-configure itself as either an Asker node or as an Answerer node according to the present flow. The process may be made automatic;

4:2 Read the cluster size M from the configuration. The node e.g. pulls the cluster size from a configuration table. The table may suitably be stored at the node, however, as an alternative the relevant configuration data is stored in a storage common to several nodes in the network, such as a database;

4:3 Calculate the probability of being an Asker node, $P=1/M$. As can be seen the probability of being an Asker node decreases with the size of the cluster. In other words, fewer Asker nodes are required among the total number of nodes in the system subject to the clusters forming process, when the cluster size increases;

4:4 Generate a random number R between 0 and N (N is a positive integer). In the method, the nodes involved in the cluster forming process may for example be essentially identical at startup. In order to achieve nodes with either an Asker role or Answerer role, without preconfiguring each node with a role, the nodes each generate a random number which is used to determine a role. According to this embodiment, a flexible solution is provided, with further reduced configuration needs;

4:5 Determine if $R<P \times N$: if Yes, continue to step 4:6; if No, continue to step 4:7. With the few steps 4:3-4:5, the involved nodes are thus automatically divided into two groups, which is used in the next steps for assuming an administrative role;

4:6 Assume Asker role and continue to step 4:8;

4:7 Assume Answerer role;

4:8 Start role. Depending on which role the node has assumed, the nodes now continues either of the two procedures depicted in FIGS. 5 and 6, for completing the cluster forming process.

Nodes that assume the role of an Asker become the leader of the cluster they are trying to form. An Asker node is also tasked with broadcasting the question it wants potential nodes that want to join the cluster to answer. Once the Asker node receives enough replies to its question, it will send out a broadcast message withdrawing the question.

Figure 5:
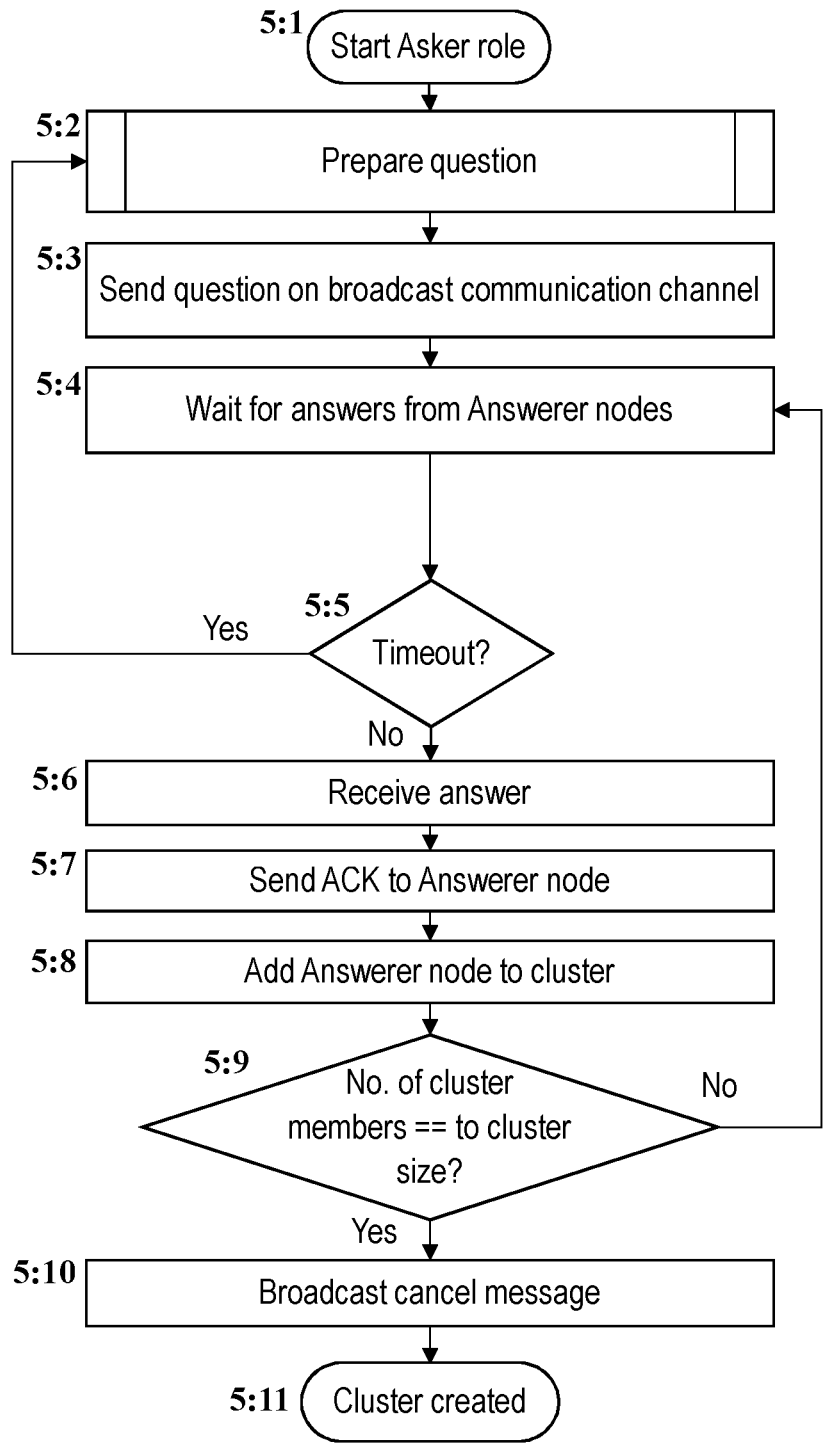
FIG. 5 is a flowchart depicting a further embodiment of a method in a first node for forming a cluster of nodes in accordance with various aspects described herein.

The flowchart in FIG. 5 depicts further exemplary steps performed by a node which has assumed an Asker role as shown in FIG. 4. The following steps may hence be performed by a first node in the cluster formation process:

5:1 The Asker role starts;

5:2 Prepare a question to be asked. By preparing a question, the Asker node may also affect the time for receiving responses as will be seen below;

5:3 Send question on the broadcast communication channel. Answerer node listening on the broadcast communication channel will thus receive the question and start finding the answer. The question is such that the responses are received at different point in time, and therefore providing an even load on the communication links and in the Asker node when processing the received responses;

5:4 Wait for answers from Answerer nodes;

5:5 Check if time has expired: if Yes, return to 5:2; if No, continue to 5:6. At this point, the Asker node may check whether a time for creating the cluster has expired. This is useful for terminating the wait for responses from the Answerer nodes and send a new or the same question again and receive the required number of response messages in order to create a cluster of the required size. In other words, Answerer nodes not yet joined in a cluster will have a new chance of responding to a first broadcast message;

5:6 Receive answer. The answer may e.g. be extracted from the received response from the Answerer nodes;

5:7 Send an Acknowledgement (ACK) message to the Answerer node that sent the answer. The process of adding a node to the cluster is preferable acknowledged so that both the Answerer node and the Asker node agree on the adding of the node. In special circumstances, an Answerer node will respond to the received first broadcast message, however, the Asker node has in the meanwhile already added the required number of nodes to the cluster and will therefore not add the Answerer node. The Answerer node is thus made aware of this fact by not receiving an ACK from the Asker node;

5:8 Add the Answerer node to the cluster as a new member in the cluster. This may require e.g. updating a table of Answerer nodes added to the cluster.

5:9 Check if number of nodes in the cluster is equal to the cluster size: if Yes, continue to 5:10; if No, return to 5:4;

5:10 Send broadcast message for cancelling further responses from the Answerer nodes. The Asker node has in 5:9 concluded that the number of nodes in the cluster has now reached the wanted level and the step of receiving further answers from the Answerer node may thus be ended to avoid unnecessary work by the nodes involved.

5:11 Cluster created. When performing the steps in this flow, the Asker node has thus added the number of nodes as indicated in the cluster size e.g. in FIG. 4, step 4:2 above.

Nodes that assume the role of an Answerer seek to join a cluster by answering the question posed by an Asker node. An Answerer node is tasked with calculating a solution for one or more questions that is broadcasted by Asker nodes. Once the Answerer node has computed the answer for one of the questions it is working on it, will reply back the answer to the Asker node that posed the question and gets added to the cluster led by that Asker node. If, while in the processes of computing a solution, the Asker node abandons the question, then the Answerer node shall abort the process of finding a solution. An Answerer node can be calculating solution to questions posed by different Asker nodes.

Figure 6:
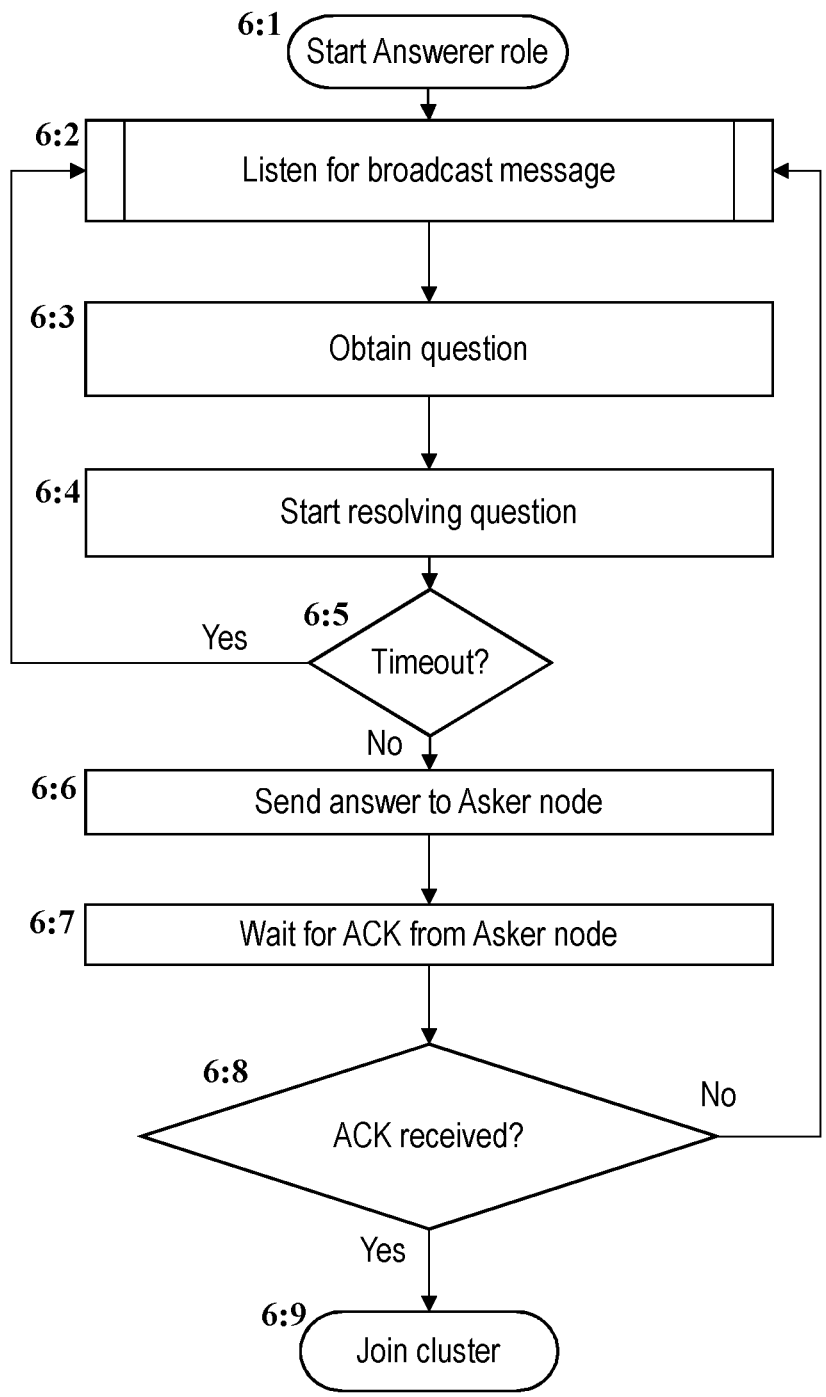
FIG. 6 is a flowchart depicting a further embodiment of a method in a second node for forming a cluster of nodes in accordance with various aspects described herein.

The flowchart in FIG. 6 depicts exemplary step performed by a node which has assumed an Answerer role as shown in FIG. 4. The following steps may hence be performed by a second node in the cluster formation process.

6:1 The Answerer role starts;

6:2 Listen for broadcast message on the broadcast communication channel. The message may include a question;

6:3 Obtain question. The question may e.g. be comprised in the first broadcast message from the Asker node;

6:4 Start resolving the question. As described above, the time for obtaining an answer to the question may vary from one Answerer to another, even though the question may be the same for every Answerer node.

6:5 Check if time for answering the question has expired. This may e.g. include checking a timer, or whether a second broadcast message has been received, indicating that the Asker node no longer requests an answer to the question: if No, continue to 6:6; if Yes, return to 6:2;

6:6 Send the answer to the Asker node. The Asker node will now receive an answer to that question posed in the first broadcast message;

6:7 Wait for an Acknowledgement (ACK) from the Asker node, indicating acceptance of membership in the cluster;

6:8 Check if ACK has been received: if Yes, continue to 6:9; if No, return to 6:2.

6:9 Join cluster as a member. At this point the Answerer node may perform further administrative task e.g. updating a configuration table for indicating a membership in the cluster.

Figure 7:
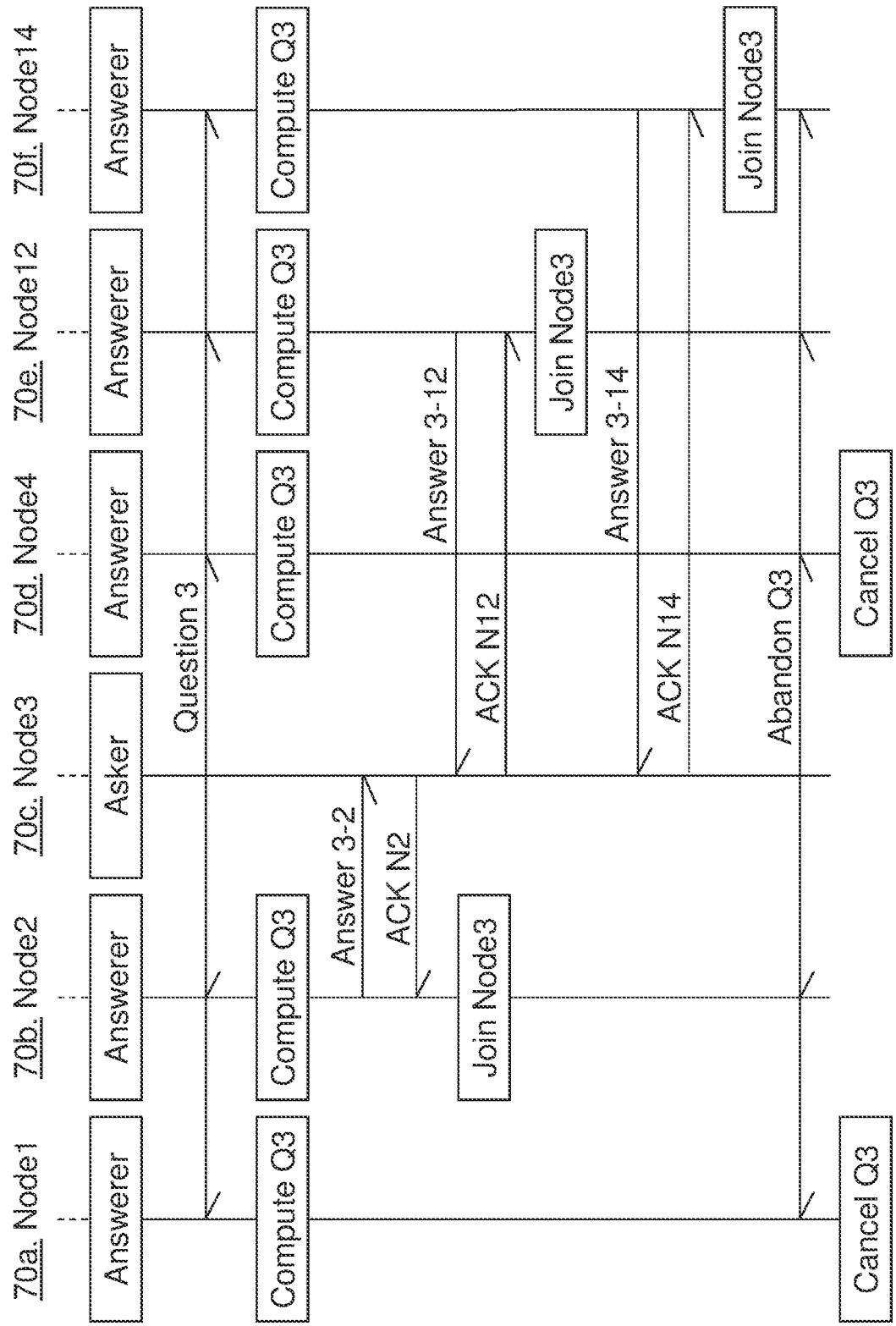
FIG. 7 is a signaling diagram illustrating a method for forming a cluster of nodes in accordance with various embodiments of the present disclosure.

Referring now to FIGS. 7 and 8, certain aspects of the procedure for posing a question and finding an answer, or a solution, will be discussed. This part of the cluster formation process may be used to further improve the process. A general idea and purpose of the question may be to spread out responses from the Answerer nodes, so that not too many of them answer at the same time. This may also help to reduce the number of messages in the communication channel. An exemplary process of selecting a question may include the following steps:

1. Generate a random number R between 0 and N.
2. Question: Can the node return a number that is within 5% of R.

Below is a process of solving the question:

While (A is not within 5% of R) do:

A=generate a random number;

Sleep for mod (R-A) unit of time;

Answer back to the Asker with number A;

Sleep is added here as an additional way of backing off and spreading the nodes from answering a close interval of time.

FIG. 7 is a signaling diagram illustrating a further example of a cluster forming process involving six nodes Node1-Node4, Node12, Node14 70, in accordance with certain embodiments herein. In this example Node3 70c has assumed an Asker role. The remaining five nodes Node1 70a, Node2 70b, Node4 70d, Node12 70e and Node14 70f have assumed an Answerer role. In a first step, Node3 70c sends a broadcast message including Question 3 which is thus received at all other five nodes Node1, Node2, Node4, Node12 and Node14. The Answerer nodes will next start computing Question 3 (Q3), i.e. find an answer to Q3. As can be seen, Node2 70*b* is the first Answerer node to send an answer, Answer 3-2, to the Asker node. This means that Node2 70*b* was able to most quickly find the answer to Q3. In response to the received answer, Node3 70*c* send an acknowledgement message, ACK N2, to Node2 70*b*. At this point, Answerer Node2 70*b* is a confirmed member of the cluster and therefore joins the Node3 70*c* cluster. The next response, Answer 3-12, to the broadcast message is received from Node12 70*e*, which is acknowledged in ACK N12. Node12 70*e* therefore joins the Node3 70*c* cluster. The last answer received, Answer 3-14, is received from Node14 70*f*. The Asker node 70*c* send an ACK message, ACK N14, in response, whereby Node14 70*f* joins the cluster of Node3 70*c*. The Asker node Node3 70*c*, has now created a cluster of the correct size as indicated e.g. by a cluster size pulled from a configuration table, and therefore sends a second broadcast message, Abandon Q3, which is received by the other five nodes. The two nodes that have not yet obtained the answer to Q3, Node1 70*a* and Node4 70*d*, upon receiving the second broadcast message cancel the process of finding an answer, Cancel Q3.

Figure 8A:
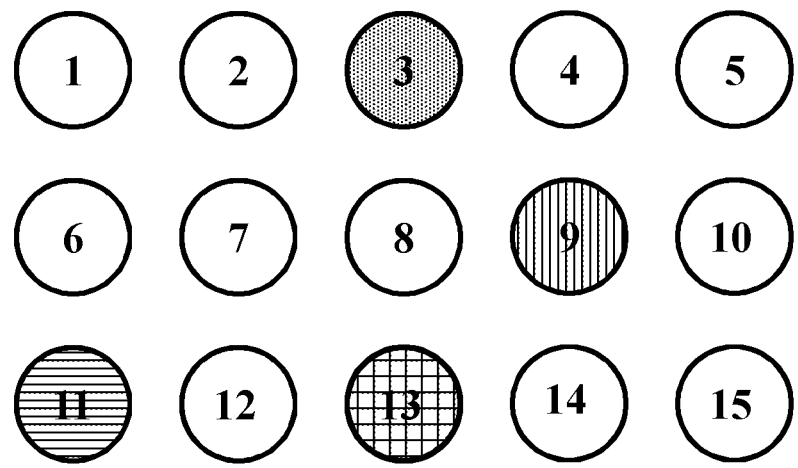
FIGS. 8a-8b illustrates schematically cluster formation when performing the method in accordance with a FIG. 7.
Figure 8B:
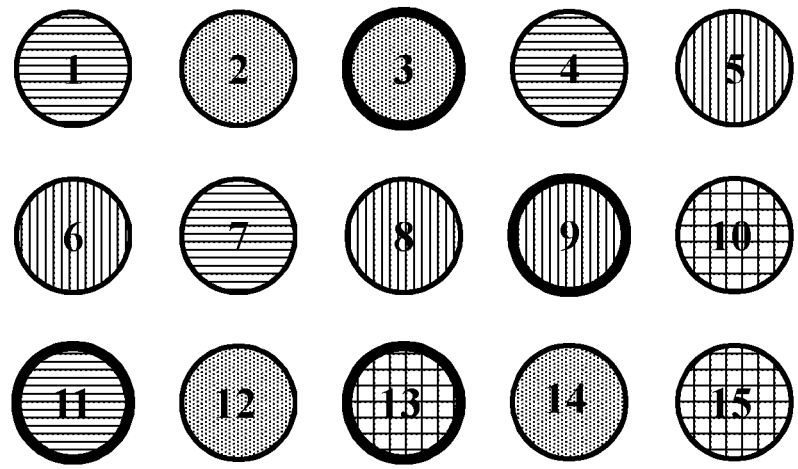

FIGS. 8*a* and 8*b* illustrates schematically the cluster formation in an exemplary network comprising 15 nodes.

In FIG. 8*a* each of the 15 nodes are assumed to have started at the same time. The cluster size is defined as 4. It is further assumed that nodes 3, 9, 11, 13 are self-selected as Askers nodes after the random role selection. This is indicated by a pattern in each of these four nodes. The remaining nodes are Answerer nodes and are thus left blank in the figure. No cluster has been created at this point. Nodes 1, 2, 3, 4, 12 and 14 correspond to Node1, Node2, Node3, Node4, Node12 and Node14, respectively, in FIG. 7.

FIG. 8*b* shows the same 15 nodes after a cluster forming process has been performed. Each of the 15 nodes is now included in a cluster as illustrated by the patterns of the respective node. The Asker nodes are further indicated by a bold line in the figure. In accordance with FIG. 7, node 3 will after the cluster forming process have created a cluster comprising nodes 2, 3, 12 and 14. As seen in FIG. 7, nodes Node1 and Node4 did not send a response to the first broadcast message sent by Node3 and received an abort message. These nodes are thus in FIG. 8*b* not included in the node 3 cluster. Accordingly, nodes 1 and 4 are included in another cluster, in which node 11 is the Asker node.

As used herein, the non-limiting term "node" may also be called a "network node", and refer to servers, desktops, wireless devices, access points, network control nodes, and like devices which may be subject to cluster formation procedure as described herein.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 9A:
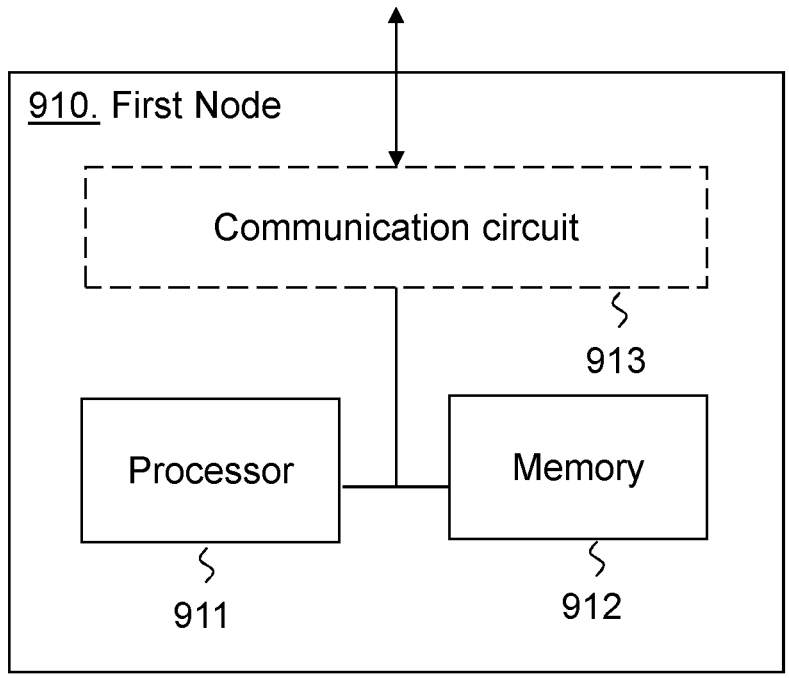
FIGS. 9-13 are illustrations of embodiments of first and second nodes, respectively, in accordance with various aspects described herein.

FIG. 9*a* is a schematic block diagram illustrating an example of a first node 910 based on a processor-memory implementation according to an embodiment. In this particular example, the first node 910 comprises a processor 911 and a memory 912, the memory 912 comprising instructions executable by the processor 911, whereby the processor is operative to obtain first information associated with a predetermined number of nodes in the cluster; determine an administrative role of the first node based on the obtained first information; as a result of determining that the administrative role of the first node is a first role, send a first broadcast message to a plurality of second nodes, the first broadcast message comprising second information for enabling control of timing of a respective response message from two or more second nodes of said plurality of second nodes; receive said response message from the two or more the second nodes; and add said two or more nodes to the cluster.

Optionally, the first node 910 may also include a communication circuit 913. The communication circuit 913 may include functions for wired and/or wireless communication with other devices and/or nodes in the network. In a particular example, the communication circuit 913 may be based on radio circuitry for communication with one or more other nodes, including transmitting and/or receiving information. The communication circuit 913 may be interconnected to the processor 911 and/or memory 912. By way of example, the communication circuit 913 may include any of the following: a receiver, a transmitter, a transceiver, input/output (I/O) circuitry, input port(s) and/or output port(s).

Figure 10A:
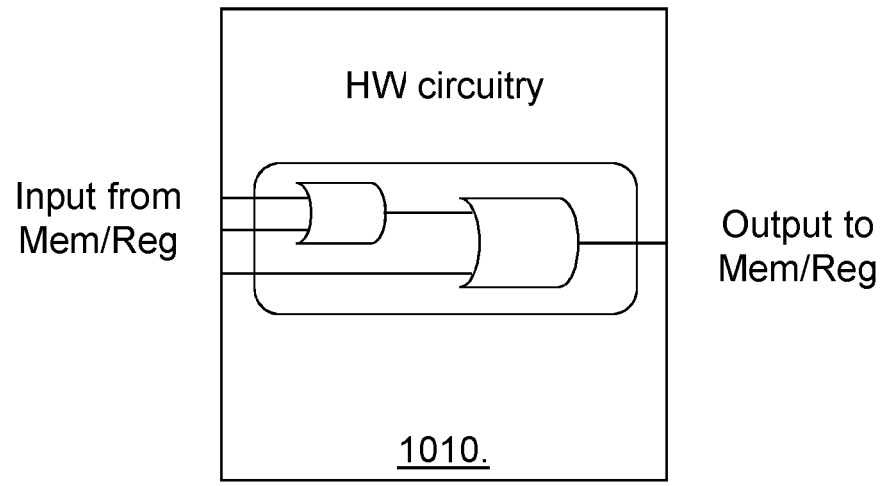

FIG. 10*a* is a schematic block diagram illustrating another example of a first node 1010 based on a hardware circuitry implementation according to an embodiment. Examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (Reg), and/or memory units (Mem).

Figure 11A:
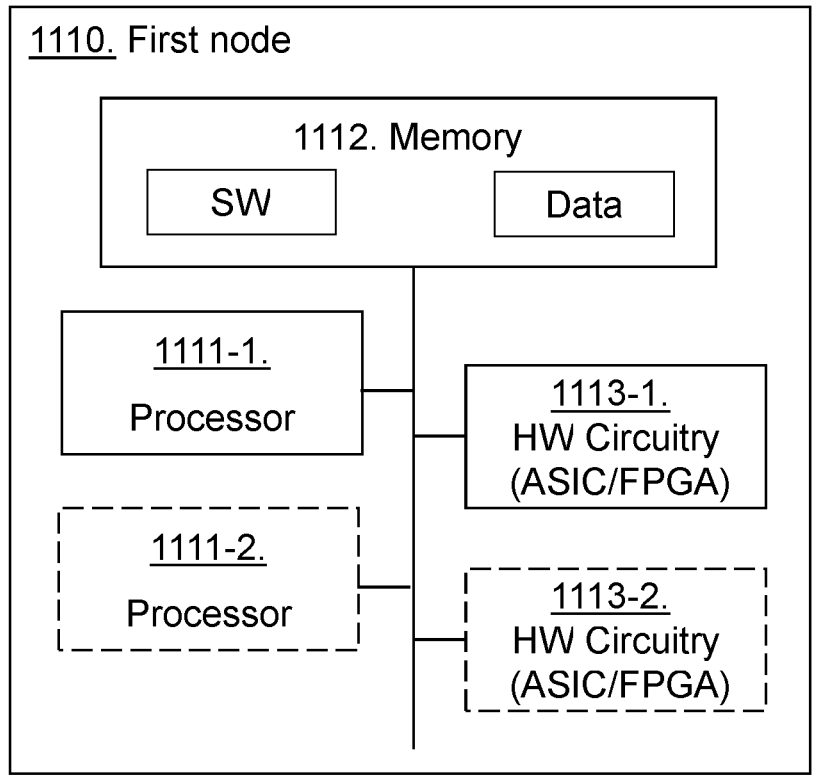

FIG. 11*a* is a schematic block diagram illustrating yet another example of a first node 1110, based on combination of both processor(s) 1111-1, 1111-2 and hardware circuitry 1113-1, 1113-2 in connection with suitable memory unit(s) 1112. The first node 1110 comprises one or more processors 1111-1, 1111-2, memory 1112 including storage for software and data, and one or more units of hardware circuitry 1113-1, 1113-2 such as ASICs and/or FPGAs. The overall functionality is thus partitioned between programmed software (SW) for execution on one or more processors 1111-1, 1111-2, and one or more pre-configured or possibly reconfigurable hardware circuits 1113-1, 1113-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 12A:
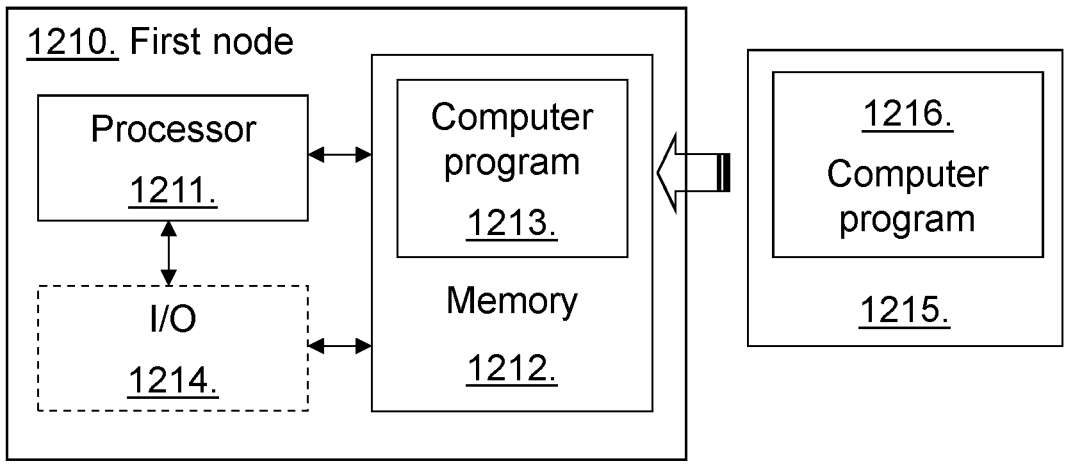

FIG. 12a is a schematic diagram illustrating an example of a computer-implementation of a first node 1210, according to an embodiment. In this particular example, at least some of the steps, functions, procedures, modules and/or blocks described herein are implemented in a computer program 1213; 1216, which is loaded into the memory 1212 for execution by processing circuitry including one or more processors 1211. The processor(s) 1211 and memory 1212 are interconnected to each other to enable normal software execution. An optional input/output device 1214 may also be interconnected to the processor(s) 1211 and/or the memory 1212 to enable input and/or output of relevant data such as input parameter(s) and/or resulting output parameter(s).

The processing circuitry including one or more processors 1211 is thus configured to perform, when executing the computer program 1213, well-defined processing tasks such as those described herein.

In a particular embodiment, the computer program 1213; 1216 comprises instructions, which when executed by at least one processor 1211, cause the processor(s) 1211 to obtain first information associated with a predetermined number of nodes in the cluster; determine an administrative role of the first node based on the obtained first information; as a result of determining that the administrative role of the first node is a first role, send a first broadcast message to a plurality of second nodes, the first broadcast message comprising second information for enabling control of timing of a respective response message from two or more second nodes of said plurality of second nodes; receive said response message from the two or more the second nodes; and add said two or more nodes to the cluster.

The term 'processor' should be interpreted in a general sense as any system or device capable of executing program code or computer program instructions to perform a particular processing, determining or computing task.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 1213; 1216 may be realized as a computer program product, which is normally carried or stored on a computer-readable medium 1212; 1215, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figures 13A, 13B:
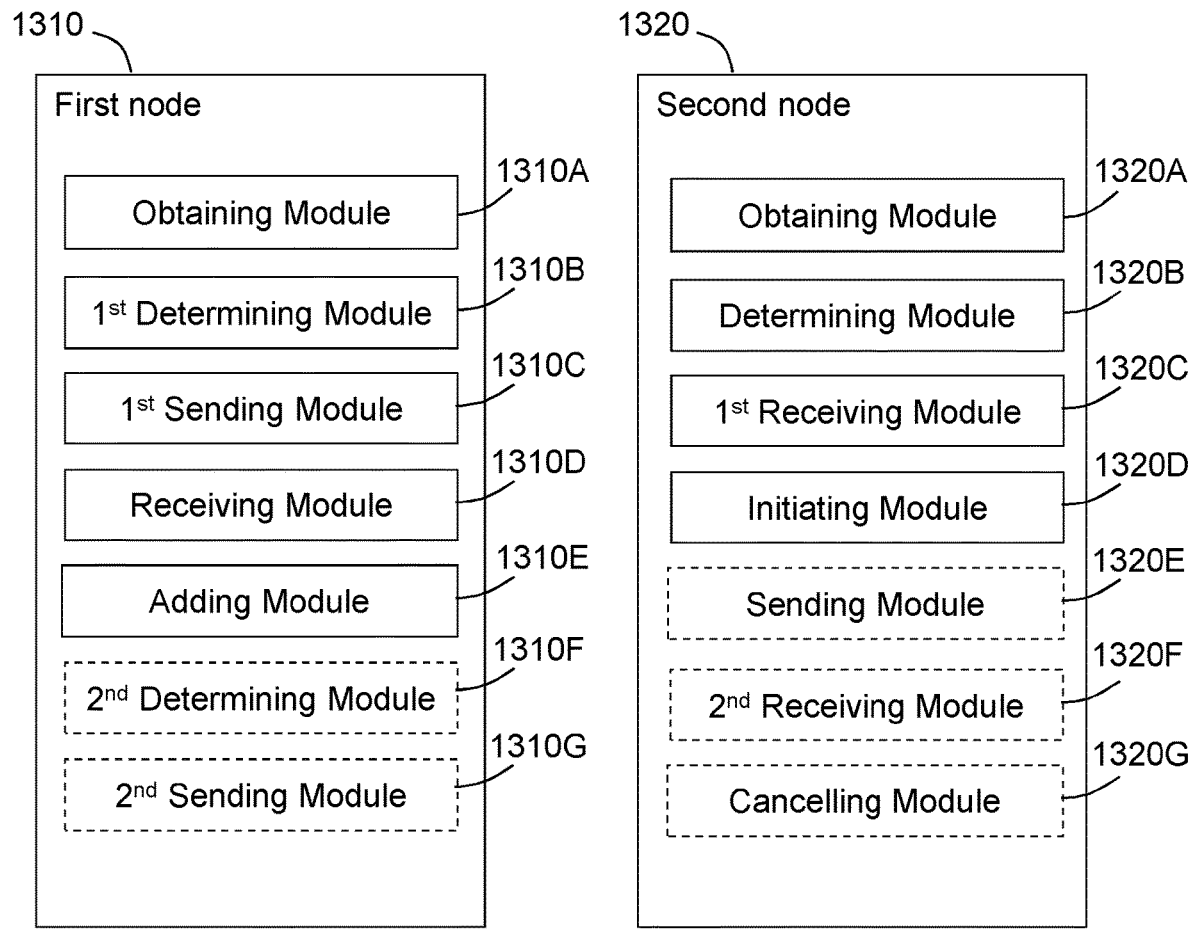

FIG. 13a is a schematic diagram illustrating an example of a first node 1310, for forming a cluster of nodes comprising an obtaining module 1310A for obtaining first information associated with a predetermined number of nodes in the cluster. The first node further comprises a first determining module 1310B for determining an administrative role of the first node based on the obtained first information. The first node further comprises a first sending module 1310C for, as a result of determining that the administrative role of the first node is a first role, sending a first broadcast message to a plurality of second nodes, the first broadcast message comprising second information for enabling control of timing of a respective response message from two or more second nodes of said plurality of second nodes. The first node also comprises a receiving module 1310D for receiving said respective response message from the two or more second nodes and an adding module 1310E for adding said two or more second nodes to the cluster.

Optionally, the first node 1310 further comprises a second determining module 1310F for determining whether a number of nodes in the cluster fulfills a cluster size criterion based on the first information and a second sending module 1310G for, as a result of determining that the cluster size criterion is fulfilled, sending a second broadcast message to the plurality of nodes, the second broadcast message comprising an indicator for indicating that a time of responding to said first broadcast message has expired.

Alternatively, it is possible to realize the module(s) in FIG. 13a predominantly by hardware modules, or alternatively by hardware, with suitable interconnections between relevant modules. Examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

Turning now to the second node, embodiments are described in accordance with various aspects herein.

Figure 9B:
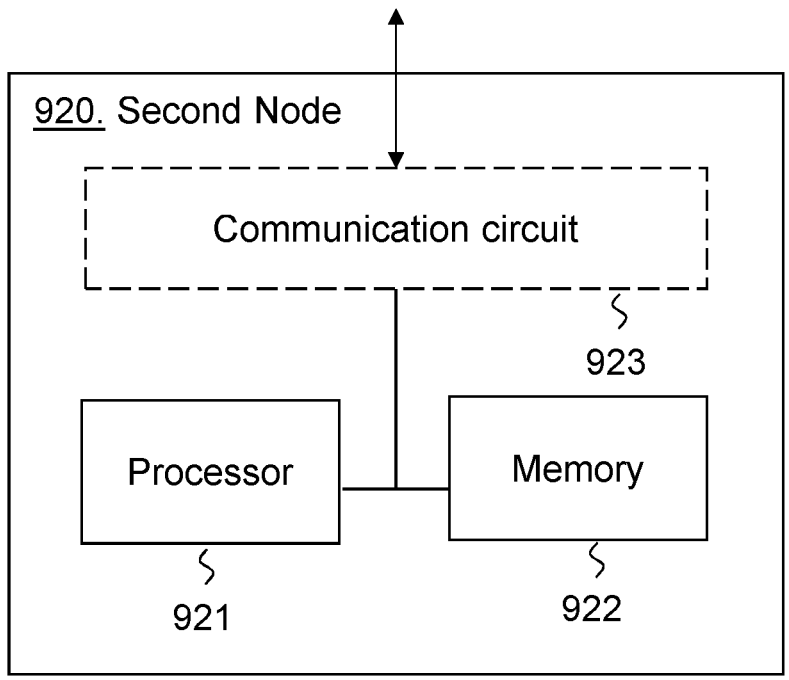

FIG. 9b is a schematic block diagram illustrating an example of a second node 920 based on a processor-memory implementation according to an embodiment. In this particular example, the second node 920 comprises a processor 921 and a memory 922, the memory 922 comprising instructions executable by the processor 921, whereby the processor is operative to obtain first information associated with a predetermined number of nodes in a cluster; determine an administrative role of the second node based on the obtained information; as result of determining that the administrative role of the second node is a second role, receive a first broadcast message from a first node, the first broadcast message comprising second information for controlling a sending time of a response message; and responsive to receiving the first broadcast message, initiate a task of preparing a response message.

Optionally, the second node 920 may also include a communication circuit 923. The communication circuit 923 may include functions for wired and/or wireless communication with other devices and/or nodes in the network. In a particular example, the communication circuit 923 may be based on radio circuitry for communication with one or more other nodes, including transmitting and/or receiving information. The communication circuit 923 may be interconnected to the processor 921 and/or memory 922. By way of example, the communication circuit 923 may include any of the following: a receiver, a transmitter, a transceiver, input/output (I/O) circuitry, input port(s) and/or output port(s).

Figure 10B:
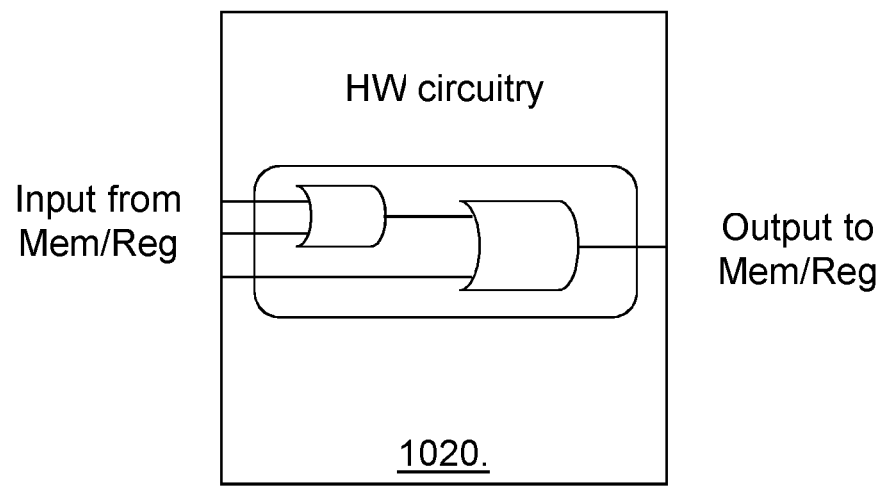

FIG. 10b is a schematic block diagram illustrating another example of a second node 1020 based on a hardware circuitry implementation according to an embodiment. Examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (Reg), and/or memory units (Mem).

Figure 11B:
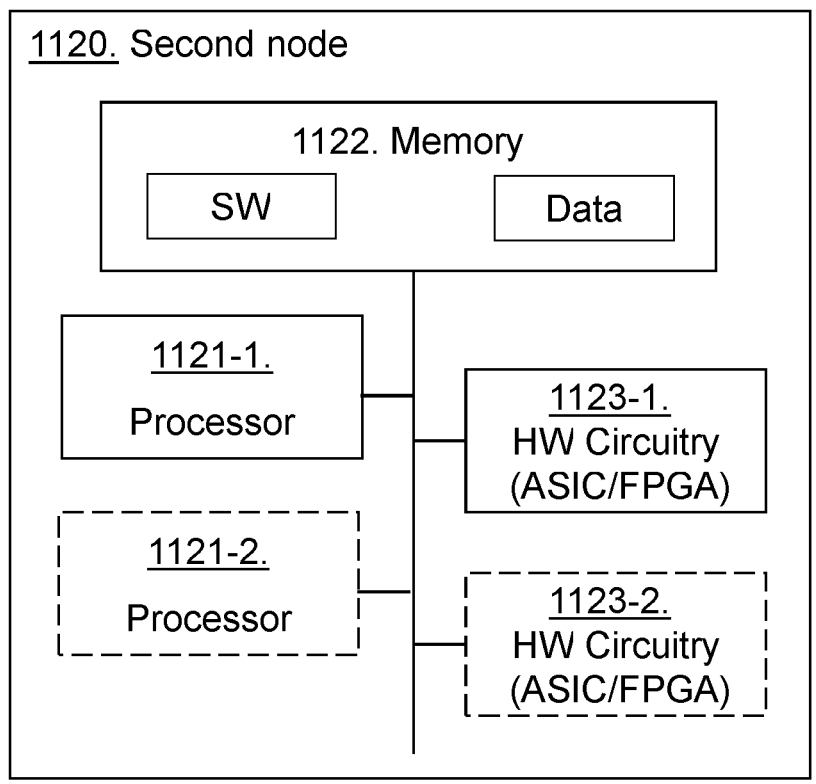

FIG. 11b is a schematic block diagram illustrating yet another example of a second node 1120, based on combination of both processor(s) 1121-1, 1121-2 and hardware circuitry 1123-1, 1123-2 in connection with suitable memory unit(s) 1122. The second node 1120 comprises one or more processors 1121-1, 1121-2, memory 1122 including storage for software and data, and one or more units of hardware circuitry 1123-1, 1123-2 such as ASICs and/or FPGAs. The overall functionality is thus partitioned between programmed software (SW) for execution on one or more processors 1121-1, 1121-2, and one or more pre-configured or possibly reconfigurable hardware circuits 1123-1, 1123-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 12B:
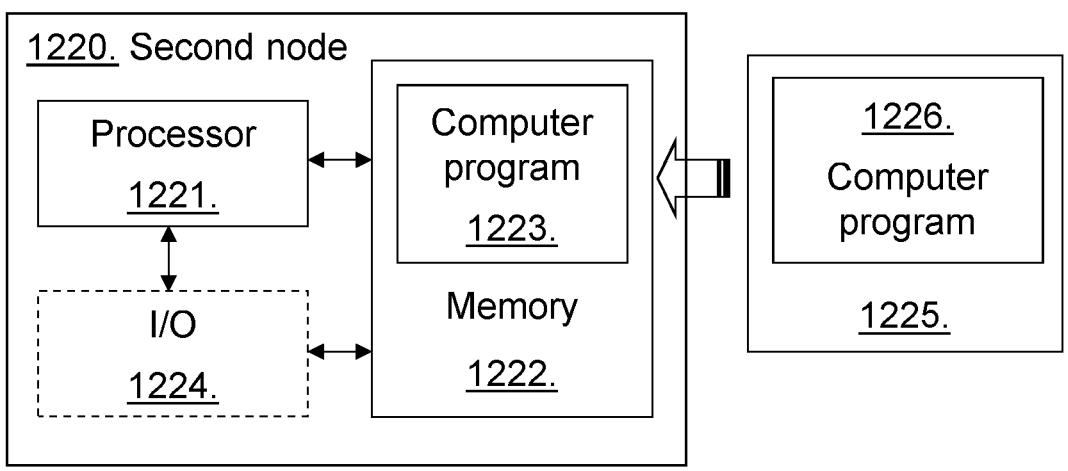

FIG. 12b is a schematic diagram illustrating an example of a computer-implementation of a second node 1220, according to an embodiment. In this particular example, at least some of the steps, functions, procedures, modules and/or blocks described herein are implemented in a computer program 1223; 1226, which is loaded into the memory 1222 for execution by processing circuitry including one or more processors 1221. The processor(s) 1221 and memory 1222 are interconnected to each other to enable normal software execution. An optional input/output device 1224 may also be interconnected to the processor(s) 1221 and/or the memory 1222 to enable input and/or output of relevant data such as input parameter(s) and/or resulting output parameter(s).

The processing circuitry including one or more processors 1221 is thus configured to perform, when executing the computer program 1223, well-defined processing tasks such as those described herein.

In a particular embodiment, the computer program 1223; 1226 comprises instructions, which when executed by at least one processor 1221, cause the processor(s) 1221 to obtain first information associated with a predetermined number of nodes in a cluster; determine an administrative role of the second node based on the obtained information; as result of determining that the administrative role of the second node is a second role, receive a first broadcast message from a first node, the first broadcast message comprising second information for controlling a sending time of a response message; and responsive to receiving the first broadcast message, initiate a task of preparing a response message.

The term 'processor' should be interpreted in a general sense as any system or device capable of executing program code or computer program instructions to perform a particular processing, determining or computing task.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 1223; 1226 may be realized as a computer program product, which is normally carried or stored on a computer-readable medium 1222; 1225, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

FIG. 13b is a schematic diagram illustrating an example of a second node 1320, for forming a cluster of nodes comprising an obtaining module 1320A for obtaining first information associated with a predetermined number of nodes in the cluster. The second node further comprises a determining module 1320B for determining an administrative role of the second node based on the obtained first information. The second node further comprises a first receiving module 1320C for, as a result of determining that the administrative role of the second node is a second role, receiving a first broadcast message from a first node, the first broadcast message comprising second information for controlling a sending time of a response message. The second node also comprises an initiating module 1320D for, responsive to receiving the first broadcast message, initiating a task of preparing a response message.

Optionally, the second node 1320 further comprises a sending module 1320E for, as a result of finalizing the task of preparing a response message, sending the response message to the first node.

As another option, the second node 1320 further comprises a second receiving module 1320F for receiving a second broadcast message from the first node. The second node 1320 according to this option further comprises a cancelling module 1320G for, responsive to receiving the second broadcast message, cancelling the task of preparing a response message.

Alternatively, it is possible to realize the module(s) in FIG. 13b predominantly by hardware modules, or alternatively by hardware, with suitable interconnections between relevant modules. Examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method performed by a first node for forming a cluster of nodes, the method comprising:
    determining an administrative role for the first node;
    as a result of determining that the administrative role for the first node is a first role, broadcasting a first broadcast message wherein a second node that is not in the cluster receives the first broadcast message, the first broadcast message comprising control information for controlling a timing at which the second node, which is not in the cluster, transmits to the first node a response message responsive to the first broadcast message;
    receiving a first response message responsive to the first broadcast message, wherein the first response message was transmitted by the second node; and
    in response to receiving the first response message transmitted by the second node, i) adding the second node to the cluster or ii) determining whether or not the cluster is full and then adding the second node to the cluster if it is determined that the cluster is not full.

2. The method of claim 1, further comprising:
    obtaining first information associated with a predetermined number of nodes in the cluster;
    determining whether a number of nodes in the cluster fulfils a cluster size criterion based on the first information; and
    as a result of determining that the cluster size criterion is fulfilled, broadcasting a second broadcast message, the second broadcast message comprising an indicator for indicating that the cluster size criterion is fulfilled.

3. The method of claim 2, wherein the indicator indicates that the cluster size criterion is fulfilled.

4. The method of claim 2, wherein obtaining the first information comprises receiving said first information from an operations and maintenance node or pulling said first information from a configuration table.

5. The method of claim 1, wherein determining the administrative role comprises obtaining a randomly generated number (R) and determining whether:

$$R < P \times N, \text{ wherein}$$

$$P = 1/M,$$

M equals a predetermined number of nodes in the cluster, $$0 \le R \le N, \text{ and}$$

N is a positive integer.

6. The method of claim 1, wherein the control information triggers the second node to perform a process that includes generating a first random number (A1).

7. The method of claim 6, wherein
    the process further includes determining whether A1 is within X % of R, where X is a predetermined value and R is a predetermined value.

8. The method of claim 7, wherein the process further includes:
as a result of determining that A1 is not within X % of R, generating second random number A2 and determining whether A2 is within X % of R; and
as a result of determining that A2 is within X % of R, transmitting the first response message.

9. The method of claim 1, wherein
the first broadcast message initiates a task at the plurality of nodes,
the task comprises obtaining an answer to a question, and
the control information is associated with a time of finalizing the task.

10. The method of claim 1, wherein
the first response message comprises an answer to a question, and
the control information comprises the question.

11. A computer program product comprising a non-transitory computer-readable medium storing computer program comprising instructions which, when executed by at least one processor cause the at least one processor to perform the method of claim 1.

12. A first node for forming a cluster of nodes, the first node configured to perform a process that comprises:
determining an administrative role for the first node;
as a result of determining that the administrative role for the first node is a first role, broadcasting a first broadcast message, wherein a second node that is not in the cluster receives the first broadcast message, the first broadcast message comprising control information for controlling a timing at which the second node, which is not in the cluster, transmits to the first node a response message responsive to the first broadcast message; and
in response to receiving a first response message transmitted by the second node, wherein the first response message is responsive to the first broadcast message, i) adding the second node to the cluster or ii) determining whether or not the cluster is full and then adding the second node to the cluster if it is determined that the cluster is not full.

13. A method performed by a second node for forming a cluster of nodes, the method comprising:
receiving a first broadcast message transmitted by a first node, the first broadcast message comprising control information for controlling a time at which the second node transmits to the first node a response message responsive to the first broadcast message; and
responsive to receiving the first broadcast message, performing a process for transmitting the response message, wherein the process comprises:
generating a first random number (A1); and
based on A1, either generating a second random number or transmitting the response message
determining whether A1 satisfies a condition; and
if A1 satisfies the condition, then transmitting the response message, otherwise generating a second random number.

14. The method of claim 13, wherein
the control information comprises a number (R), and
determining whether A1 satisfies the condition comprises determining whether A1 is within X % of R, wherein X is a predetermined value.

15. A computer program product comprising a non-transitory computer-readable medium storing computer program comprising instructions which, when executed by at least one processor cause the at least one processor to perform the method of claim 13.

16. A second node for forming a cluster of nodes, the second node configured to:
responsive to receiving a first broadcast message comprising control information for controlling a time at which the second node transmits to a first node a response message responsive to the first broadcast message, perform an answering process that comprises:
generating a first random number (A1); and
determining whether A1 satisfies a condition; and
if A1 satisfies the condition, then transmitting the response message, otherwise generating a second random number.

17. The second node of claim 16, wherein the answering process further comprises:
determining whether A2 satisfies a condition; and
if A2 satisfies the condition, then transmitting the response message, otherwise generating a third random number.

18. The second node of claim 16, further configured to:
receive a second broadcast message from the first node; and
responsive to the received second broadcast message, cancel the answering process.

* * * * *